(12) United States Patent
Ishimizu et al.

(10) Patent No.: US 11,021,088 B2
(45) Date of Patent: Jun. 1, 2021

(54) ARMREST STRUCTURE FOR SEAT

(71) Applicant: STARTING INDUSTRIAL CO., LTD., Tokyo (JP)

(72) Inventors: Ami Ishimizu, Tokyo (JP); Hiroki Kato, Tokyo (JP)

(73) Assignee: STARTING INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 16/794,063

(22) Filed: Feb. 18, 2020

(65) Prior Publication Data
US 2020/0262324 A1    Aug. 20, 2020

(30) Foreign Application Priority Data
Feb. 18, 2019   (JP) .............................. JP2019-026214

(51) Int. Cl.
*B60N 2/75*   (2018.01)
*B60N 2/38*   (2006.01)

(52) U.S. Cl.
CPC ............... *B60N 2/773* (2018.02); *B60N 2/38* (2013.01)

(58) Field of Classification Search
CPC .......... A47C 1/03; A47C 1/0307; B60N 2/777
USPC .................................................. 297/411.37
See application file for complete search history.

(56) References Cited

U.S. PATENT DOCUMENTS

| 5,967,594 | A  | * | 10/1999 | Ramanujam | ........ B60R 21/0428 296/153 |
| 7,387,341 | B1 | * | 6/2008  | Tsai      | ...................... A47C 1/0307 297/411.35 |
| 8,596,722 | B2 | * | 12/2013 | Haubrich  | ............... B60N 2/777 297/411.37 |
| 2018/0222365 | A1 | | 8/2018 | Shimizu | |

FOREIGN PATENT DOCUMENTS

| DE | 102015106386 A1 | 5/2016 |
| JP | H04051254 A | 4/1992 |
| JP | H07023461 U | 5/1995 |
| JP | H10331199 A | 12/1998 |
| JP | H11293702 A | 10/1999 |

(Continued)

OTHER PUBLICATIONS

Extended European Search Report for related EP App. No. 20157649.3 dated Jul. 6, 2020; 6 pages.

*Primary Examiner* — Sarah B McPartlin
(74) *Attorney, Agent, or Firm* — Procopio, Cory, Hargreaves & Savitch LLP

(57) ABSTRACT

An armrest structure for seat includes an armrest configured to move in a lateral width direction of the seat, a guide block configured to move in a front-rear direction of the seat, and an operation portion configured to be manually operated, such that the guide block moves in the front-rear direction. The armrest and the guide block are slidably engaged with each other in a direction inclined with respect to the lateral width direction and the front-rear direction of the seat. The armrest is configured to move in conjunction with the guide block in the lateral width direction, in response to an (Continued)

operation that the operation portion is operated to move the guide block in the front-rear direction. According to this armrest structure, an interval between the armrest on both sides can be adjusted in accordance with the physique and the posture of a seated person.

5 Claims, 7 Drawing Sheets

(56) References Cited

FOREIGN PATENT DOCUMENTS

| | | |
|---|---|---|
| JP | 2000233672 A | 8/2000 |
| JP | 2003204839 A | 7/2003 |
| JP | 2017066782 A | 4/2017 |

* cited by examiner

ARMREST STRUCTURE FOR SEAT

CROSS-REFERENCE TO RELATED APPLICATIONS

This application is based on and claims priority under 35 USC 119 from Japanese Patent Application No. 2019-026214 filed on Feb. 18, 2019, the contents of which are incorporated herein by reference.

TECHNICAL FIELD

The present disclosure relates to an armrest structure used in a driver seat of a construction machine.

BACKGROUND ART

In general, armrests are provided on both sides of a driver seat of a construction machine such as an excavator. As such armrest, for example, there has been an armrest whose upper-lower height position can be adjusted as shown in JPH11-293702A.

In such armrest of related art, there is a problem that the armrest cannot be moved in a lateral width direction with respect to a seat surface, and thus cannot sufficiently adapt to the physique and the posture of an operator.

In this regard, JPH07-23461U (see FIG. 8 and the like) describes a structure including two support shafts protruding in a lateral width direction from a driver seat backrest, in which left-right positions of armrests are to be adjusted by adjusting left-right protruding amounts of the support shafts.

However, in the configuration described in JPH07-23461U, since the armrests are attached to the support shafts protruding from the backrest, there is a problem that angles of the armrests change due to reclining of the backrest.

In addition, since support shafts protruding in the lateral width direction are required, there is a problem that a layout of the armrests is greatly limited. For example, since the support shafts are disposed so as to be perpendicular to the armrests, there is a problem that the structure cannot be made compact, and the support shafts and the armrests are required to be arranged so as to wrap around from the backrest to both sides of the seat.

Further, in the configuration described in JPH07-23461U, to make the height positions of the armrests variable, a mechanism for upper-lower movement is required for each structure that supports the support shafts, and thus there is a problem of a complicated structure.

SUMMARY OF INVENTION

The present disclosure is to provide an armrest structure for seat that can adjust a position of an armrest in a lateral width direction without using a support shaft protruding in the lateral width direction.

According to an aspect of the present disclosure, an armrest structure of a seat includes a support portion, an armrest configured to move in a lateral width direction of the seat with respect to the support portion, a guide block configured to move in a front-rear direction of the seat with respect to the support portion, and an operation portion configured to be manually operated, such that the guide block moves in the front-rear direction. The armrest and the guide block are slidably engaged with each other in a direction inclined with respect to the lateral width direction and the front-rear direction of the seat. The armrest is configured to move in conjunction with the guide block in the lateral width direction, in response to an operation that the operation portion is operated to move the guide block in the front-rear direction.

According to the aspect of the present disclosure, since the armrest can be moved in the lateral width direction with respect to the seat surface, an interval between the armrest on both sides can be adjusted in accordance with the physique and the posture of a seated person. Further, since the shaft member protruding in the lateral width direction from the backrest is not required to be used, the angle of the armrest does not change due to the reclining. In addition, since no protruding member is present, a degree of freedom in layout can be increased. Moreover, since the guide block is simply required be vertically overlapped with respect to the armrest, it is possible to change a position of the armrest in the lateral width direction without greatly changing the existing layout of the seat or the existing structure of the armrest.

According to another aspect of the present disclosure, the operation portion may include a screw shaft which is rotatable around an axis of the screw shaft. The guide block may be attached to the screw shaft. The guide block attached to the screw shaft may be configured to move in an axial direction of the screw shaft, in response to the operation that the operation portion is operated to rotate the screw shaft. According to this structure, since the armrest can be moved in the lateral width direction by merely axially rotating the operating portion, it is not necessary to greatly move the operating portion. Therefore, the position of the armrest can be easily adjusted by the seated person. In addition, since the operation portion is not moved greatly, it is not necessary to consider interference of the operation portion with other members, so that the degree of freedom in layout of the seat is not impaired.

According to another aspect of the present disclosure, the operation portion may be disposed below the armrest such that the screw shaft is parallel to a longitudinal direction of the armrest. According to such configuration, since the guide block and the operation portion can be arranged below the armrest in a manner overlapping with each other, the design of the armrest structure can be kept simple. In addition, since the armrest structure can be made compact, the degree of freedom in layout of the seat is not impaired.

BRIEF DESCRIPTION OF DRAWINGS

FIGS. 4A to 4C are views of the armrest in which slide shafts are removed, in which FIG. 4A is a perspective view from the bottom side thereof, FIG. 4B is a bottom view thereof, and FIG. 4C is an cross-sectional view at A-A line in FIG. 49.

FIGS. 5A to 5D are views of a guide block and an operation portion, in which FIG. 5A is a perspective view thereof, FIG. 5B is a side view thereof, FIG. 5C is a plane view thereof, and FIG. 5D is a plan view illustrating the operation portion.

FIGS. 6A and 6B are plan views for explaining movement of the armrest structure, in which FIG. 6A illustrates a state where the armrest is moved to a left side, and FIG. 6B illustrates a state where the armrest is moved to a right side.

FIGS. 7A and 7B are side cross-sectional views for explaining the movement of the armrest structure, in which FIG. 7A illustrates a state where the guide block is moved rearward (a view illustrating a state where the armrest is moved leftward), and FIG. 7B illustrates a state where the guide block is moved forward (a view illustrating a state where the armrest is moved rightward).

DESCRIPTION OF EMBODIMENTS

An embodiment of the present disclosure will be described with reference to the drawings.

Figure 1:
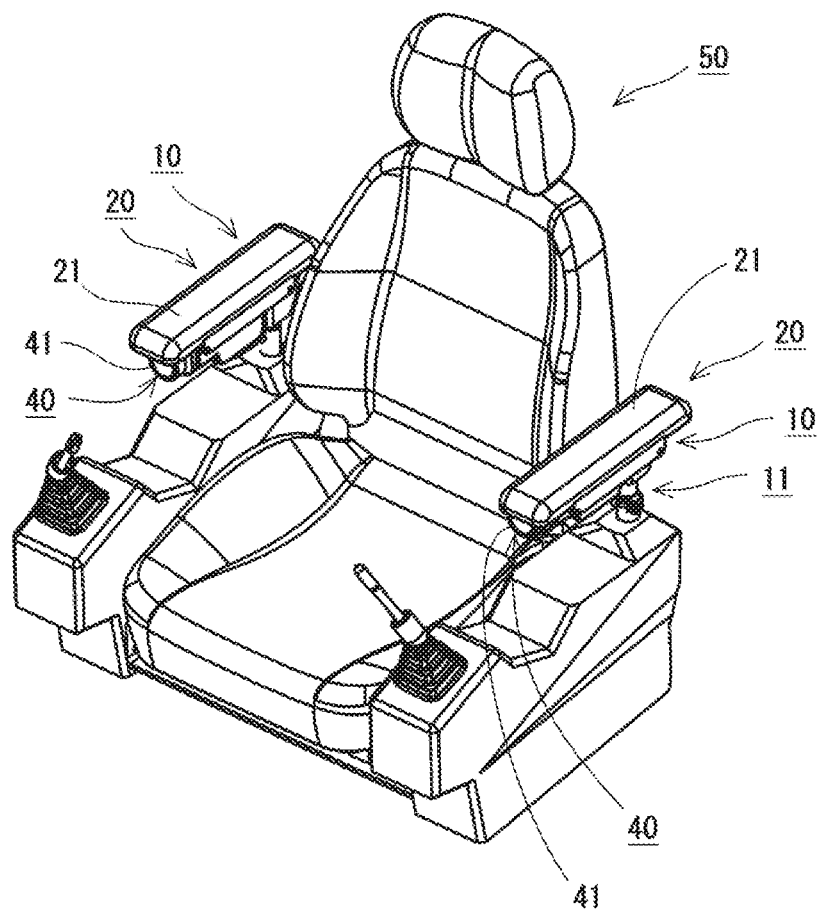
FIG. 1 is an external view of a seat.

Armrest structures 10 according to the present embodiment are installed on a seat 50 such as a driver seat of a construction machine, and are disposed on both sides of the seat 50, for example, as shown in FIG. 1. Each of the armrest structures 10 includes a support portion 11, an armrest 20, a guide block 30, and an operation portion 40.

Figure 2:
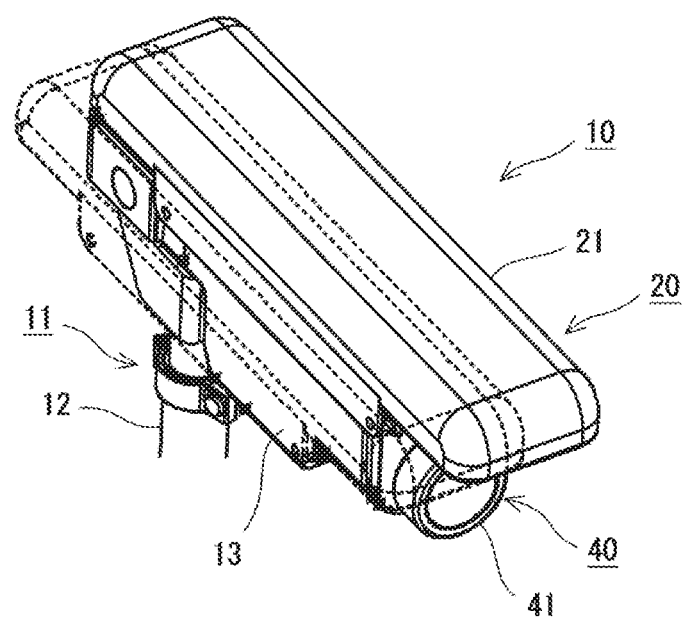
FIG. 2 is an external view of an armrest structure.

The support portion 11 supports the armrest structure 10. The support portion 11 is disposed on a side portion of the seat 50, and an armrest 20 is attached to an upper portion of the support portion 11. As shown in FIG. 2, the support portion 11 according to the present embodiment includes a support column 12 and a support arm portion 13.

The support column 12 is a pipe erected on the side portion of the seat 50. The support column 12 according to the present embodiment is attached to the seat 50 so as to be extendable, and can be fixed in a state of being extended to a predetermined length. By adjusting a length of the support column 12 in this manner, a height position of the armrest 20 can be adjusted.

The support arm portion 13 is an arm-shaped member that is substantially horizontally fixed to an upper end portion of the support column 12. The support arm portion 13 is provided for movably supporting the armrest 20 and the guide block 30, which will be described later. The support arm portion 13 according to the present embodiment is disposed along a longitudinal direction of the armrest 20, and is disposed so as to be hidden by a lower surface of the armrest 20 when projected vertically.

Figure 7A:
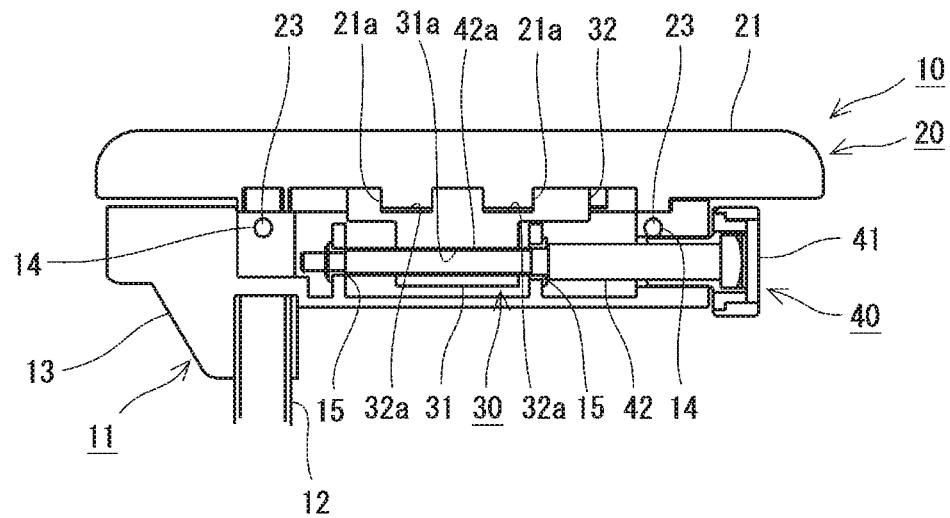
Figure 7B:
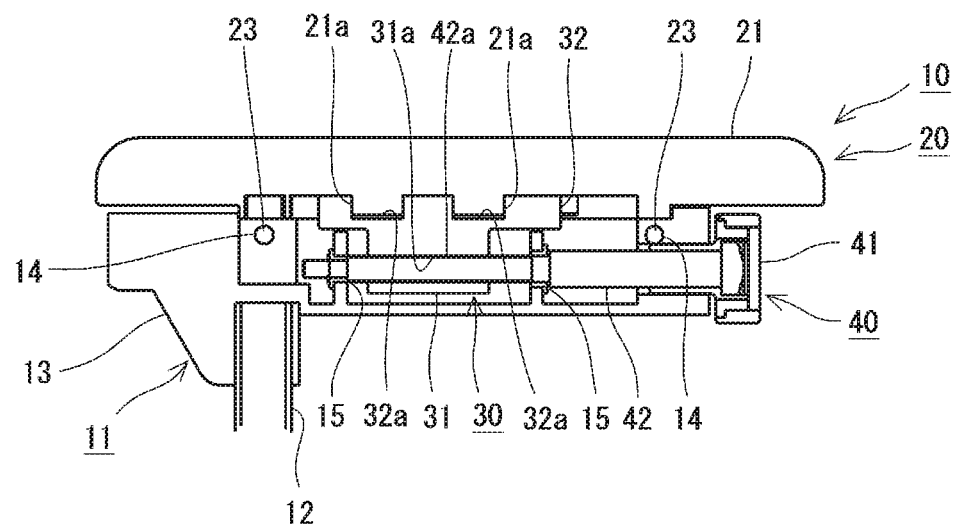

As shown in FIGS. 7A and 7B, first support holes 14 penetrating in the lateral width direction of the seat 50 are formed in the support arm portion 13. The first support hole 14 is provided for slidably supporting the armrest 20 in the lateral width direction of the seat 50. In the present embodiment, the first support holes 14 are provided at two positions on front and rear sides of each other. Further, as shown in FIGS. 7A and 7B, second support holes 15 penetrating in the front-rear direction of the seat 50 are formed inside the support arm portion 13. The second support holes 15 are for rotatably supporting the operation portion 40. The second support holes 15 are provided coaxially at two positions in the front-rear direction, and the operation portion 40 is rotatably supported by attaching the operation portion 40 as a shaft member so as to penetrate the two second support holes 15.

The armrest 20 is for the seated person sitting on the seat 50 to place an elbow. As shown in FIGS. 3A to 4C, the armrest 20 includes a top board 21 having an upper surface formed planar to place the elbow, a pair of shaft support plates 22 fixed to an underside of the top board 21, and slide shafts 23 fixed horizontally between the pair of shaft support plates 22.

Figure 4A:
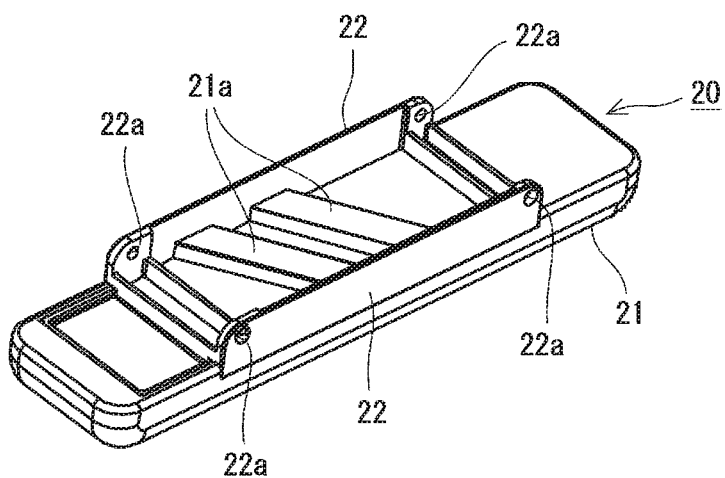
Figure 4B:
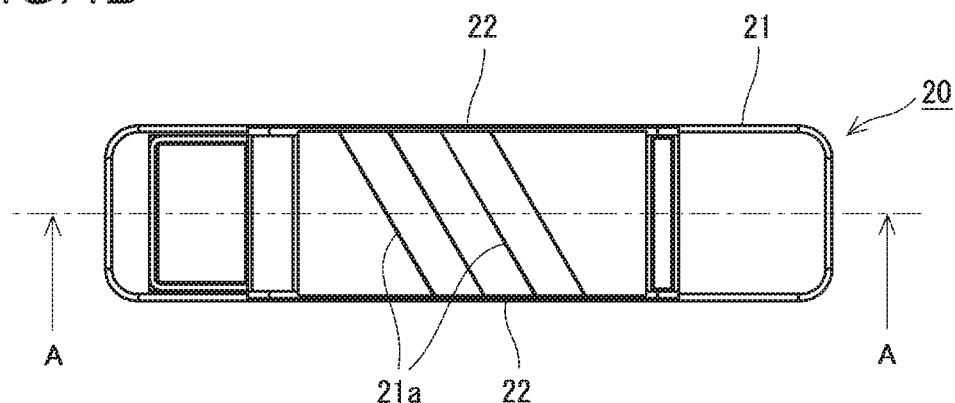
Figure 4C:
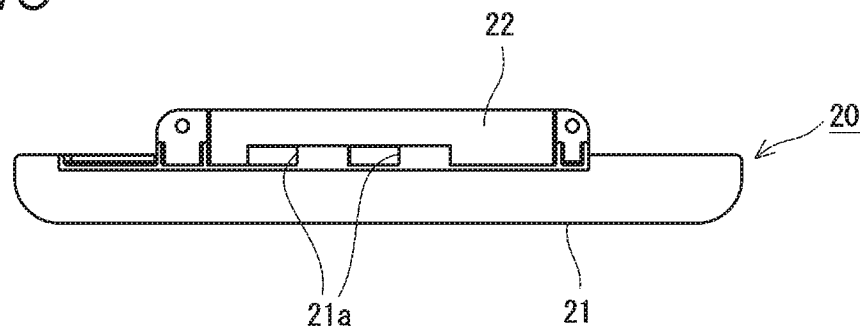

As shown in FIGS. 4A and 4B, engagement projections 21a are formed to project from an underside surface of the top board 21. The engagement projections 21a are projecting bars extending in a direction inclined with respect to the lateral width direction and the front-rear direction of the seat 50, and in the present embodiment, two engagement projections 21a are provided in parallel to each other.

The pair of shaft support plates 22 are disposed on both sides of the engagement projections 21a, and protrude downward from the underside surface of the top board 21. As shown in FIG. 4A, shaft support holes 22a for attaching the slide shafts 23 are provided in the pair of shaft support plates 22.

The slide shafts 23 are rod-shaped members for guiding sliding of the armrest 20, and are fixed between the pair of shaft support plates 22. The armrest 20 according to the present embodiment includes two slide shafts 23 that are on front and rear sides of each other, and the two slide shafts 23 are fixed to the armrest 20 in parallel to the lateral width direction of the seat 50.

Figure 3A:
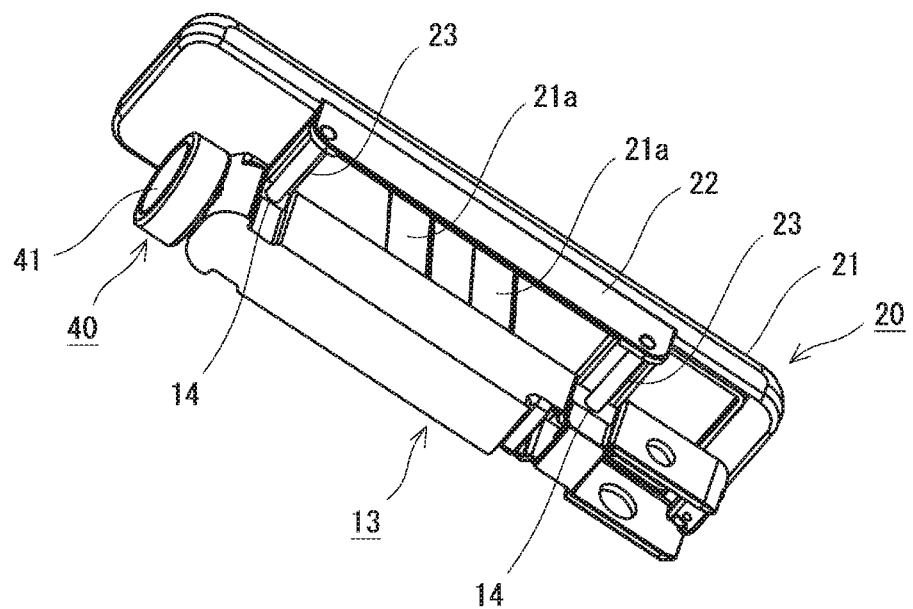
FIG. 3A is a perspective view of an armrest and accessories as viewed from a bottom side.
Figure 3B:
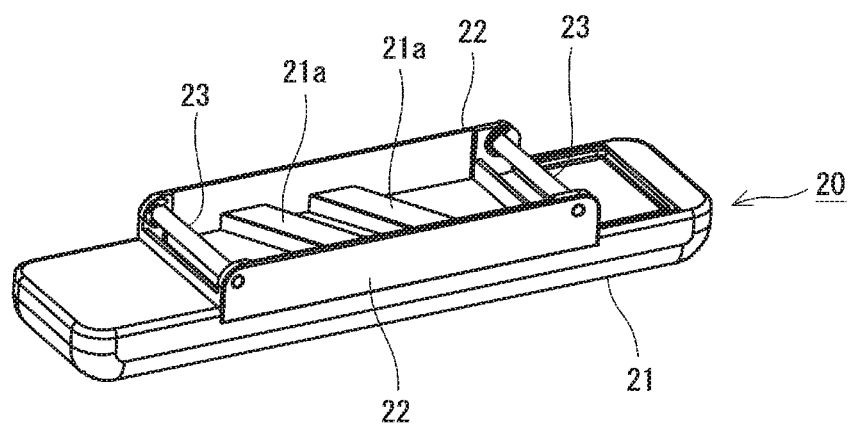
FIG. 3B is a perspective view of the armrest as viewed from the bottom side.

As shown in FIG. 3A, the armrest 20 is attached to the support portion 11 in a state where the slide shafts 23 respectively penetrate the two first support holes 14 of the support portion 11. At this time, since the slide shafts 23 are longer than a width of the support portion 11, the armrest 20 can slide in an axial direction of the slide shafts 23. In other words, as shown in FIG. 2, the armrest 20 can move in the lateral width direction of the seat 50 with respect to the support portion 11.

The guide block 30 guides movement of the armrest 20 described above. As shown in FIGS. 5A to 5D, the guide block 30 according to the present embodiment includes a nut portion 31 and a guide portion 32.

The nut portion 31 is a portion for attaching the operating portion 40 to be described later. The nut portion 31 is penetrated by a screw attachment hole 31a through which a screw shaft 42 (described later) of the operation portion 40 is inserted. The nut portion 31 is screwed to a male screw of the screw shaft 42 on an inner side of the screw attachment hole 31a, and the nut portion 31 moves in an axial direction of the screw shaft 42 when the screw shaft 42 rotates. That is, the guide block 30 can move in the axial direction of the screw shaft 42, and in other words, the guide block 30 can move in the front-rear direction of the seat 50 with respect to the support portion 11. Although not particularly shown, as a feed screw mechanism for advancing and retracting the nut portion 31 with a screw in this manner, a publicly known slide screw mechanism or ball screw mechanism can be used.

Figure 5A:
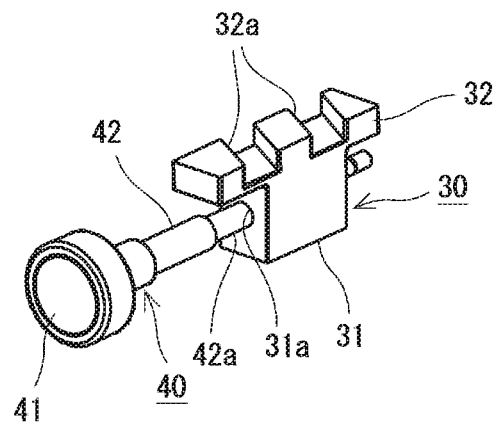
Figure 5B:
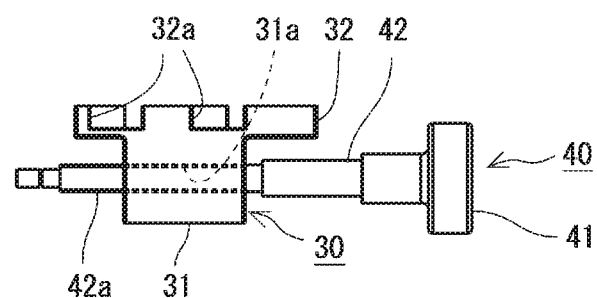
Figure 5C:
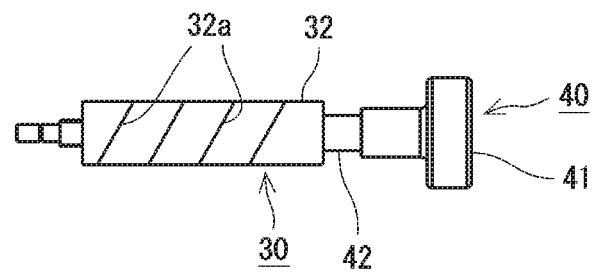

The guide portion 32 is a block-shaped portion that is attached so as to face the lower surface of the armrest 20. As shown in FIGS. 5A and 5C, guide grooves 32a are formed on an upper surface of the guide portion 32. The guide grooves 32a extend in a direction inclined with respect to the lateral width direction and the front-rear direction of the seat 50, and are slidably engaged with the engagement projections 21a of the armrest 20. In the present embodiment, two guide grooves 32a are provided parallel to each other in correspondence with the two engagement projections 21a.

Figure 5D:
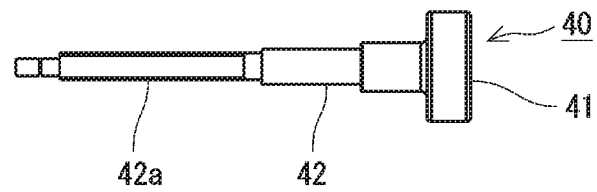

The operation portion 40 is a member to be manually operated so as to move the guide block 30 forward or backward. The operation portion 40 according to the present embodiment is a rod-like member as shown in FIG. 5D, and includes a grip 41 and the screw shaft 42.

The grip 41 is a portion that can be gripped and rotated by the seated person of the seat 50. In the present embodiment, the grip 41 is disk-shaped, and the seated person rotates the disk-shaped grip 41 to axially rotate the operation portion 40. As shown in FIGS. 1 and 2, the grip 41 is disposed below the armrest 20 and at a front side of the seat 50.

As shown in FIGS. 7A and 7B, the screw shaft 42 is a portion supported in an axially rotatable manner by the two second support holes 15 at the two positions on the front and rear sides of each other. The screw shaft 42 is provided with a snap ring and a step so as not to be detached from the second support holes 15, and the snap ring and the step are engaged with the second support holes 15 so as not to move in the axial direction. The screw shaft 42 is disposed below the armrest 20 so as to be parallel to the front-rear direction of the seat 50 (the longitudinal direction of the armrest 20). The screw shaft 42 rotates integrally when the grip 41 is rotated.

The screw shaft 42 includes a screw portion 42a whose outer periphery is formed with a male screw. The guide block 30 is attached to the screw portion 42a. Specifically, the screw shaft 42 penetrates the screw attachment hole 31a of the guide block 30, and the guide block 30 is engaged with the male screw of the screw shaft 42 on the inner side of the screw attachment hole 31a so that to be screw-driven. Therefore, when the operation portion 40 is operated to rotate the screw shaft 42, the guide block 30 attached to the screw shaft 42 moves in the axial direction of the screw shaft 42.

When a left-right position of the armrest 20 is to be adjusted using the armrest structure 10, the grip 41 of the operation portion 40 may be rotated in either direction. According to the direction in which the grip 41 is rotated, the armrest 20 moves to either the left or the right direction.

Figure 6A:
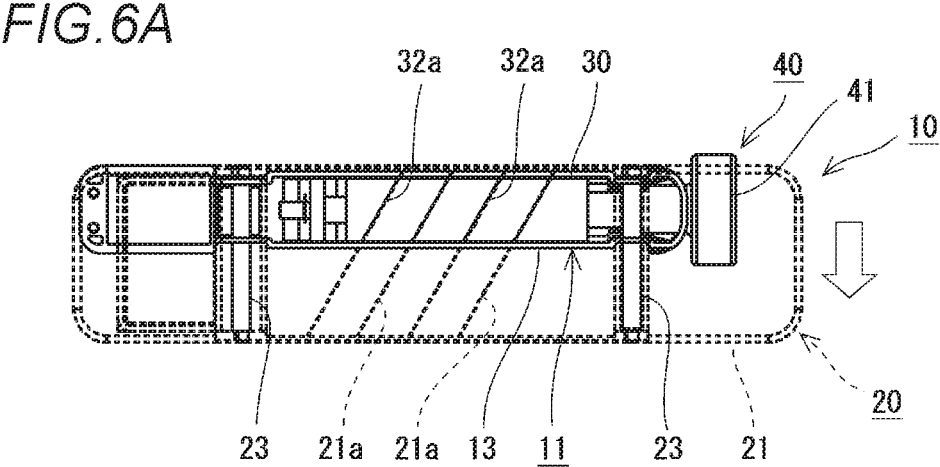

That is, when the operation portion 40 is rotated in a predetermined direction (for example, a clockwise direction) by the seated person, as shown in FIGS. 6A and 7A, the guide block 30 is screwed by the screw shaft 42 so as to move forward. At this time, since the engagement projections 21a of the armrest 20 are engaged with the guide grooves 32a of the guide block 30, the armrest 20 is pushed forward by the guide block 30. However, the armrest 20 can move only in the left-right direction, and thus moves either leftward or right ward (for example, leftward) along an extending direction of the engagement projections 21a and the guide grooves 32a.

Figure 6B:
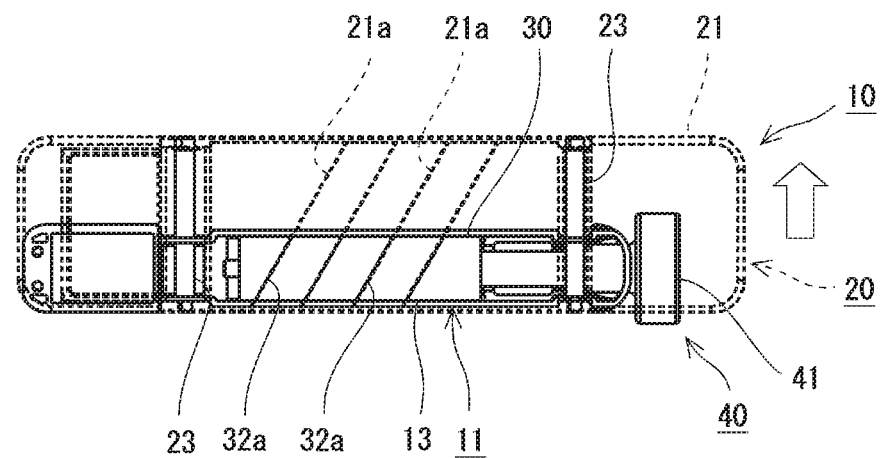

On the other hand, when the operation portion 40 is rotated in a direction opposite to the predetermined direction (for example, a counterclockwise direction) by the seated person, as shown in FIGS. 6B and 7B, the guide block 30 is screwed by the screw shaft 42 so as to move rearward. At this time, since the engagement projections 21a of the armrest 20 are engaged with the guide grooves 32a of the guide block 30, the armrest 20 is pushed rearward by the guide block 30. However, the armrest 20 can move only in the left-right direction, and thus moves opposite to the above-described direction (for example, rightward) along an extending direction of the engagement projections 21a and the guide grooves 32a.

As described above, according to the present embodiment, the armrest 20 and the guide block 30 are engaged with each other so as to be slidable in the direction inclined with respect to the lateral width direction and the front-rear direction of the seat 50, and when the operation portion 40 is operated to move the guide block 30 forward or rearward, the armrest 20 moves leftward or rightward in conjunction with the guide block 30. According to this configuration, since the armrest 20 can be moved in the lateral width direction with respect to the seat surface, the interval between the armrest 20 on both sides can be adjusted in accordance with the physique and the posture of the seated person. Further, since the shaft member protruding in the lateral width direction from the backrest is not required to be used, the angle of the armrest 20 does not change due to the reclining. In addition, since no protruding member is present, the degree of freedom in layout can be increased. Moreover, since the guide block 30 is simply required be vertically overlapped with respect to the armrest 20, it is possible to change the position of the armrest 20 in the lateral width direction without greatly changing the existing layout of the seat 50 or the existing structure of the support portion 11.

The operation portion 40 includes the screw shaft 42 configured to rotate axially, the guide block 30 is attached to the screw shaft 42, and when the operation portion 40 is operated to rotate the screw shaft 42, the guide block 30 attached to the screw shaft 42 moves in the axial direction of the screw shaft 42 Accordingly, since the armrest 20 can be moved in the lateral width direction by merely axially rotating the operating portion 40, it is not necessary to greatly move the operating portion 40. Therefore, the position of the armrest 20 can be easily adjusted by the seated person. In addition, since the operation portion 40 is not moved greatly, it is not necessary to consider interference of the operation portion 40 with other members, so that the degree of freedom in layout of the seat 50 is not impaired.

The operation portion 40 is disposed below the armrest 20 such that the screw shaft 42 is parallel to the longitudinal direction of the armrest 20. That is, since the guide block 30 and the operation portion 40 are arranged below the armrest 20 in a manner overlapping with each other, the design of the armrest structure 10 can be kept simple. In addition, since the armrest structure 10 can be made compact, the degree of freedom in layout of the seat 50 is not impaired.

The embodiment described above uses the operation portion 40 including the screw shaft 42, but may also use an operation portion 40 of a different aspect. For example, an operation portion 40 slidable in the front-rear direction of the seat 50 may be disposed on the support portion 11, and the guide block 30 may move forward or rearward in conjunction with the operation portion 40. Further, a lever-shaped operation portion 40 may be provided, and the guide block 30 may move forward or rearward in conjunction with the operation portion 40.

In the embodiment described above, the support portion 11 is erected on the side portion of the seat 50, whereas arrangement of the support portion 11 is not limited to such aspect. For example, the support portion 11 may extend from the seat 50, a floor, a ceiling, a side wall, and the like.

What is claimed is:

1. An armrest structure of a seat, comprising:
   a support portion;
   an armrest configured to move in a lateral width direction of the seat with respect to the support portion;
   a guide block configured to move in a front-rear direction of the seat with respect to the support portion; and
   an operation portion configured to be manually operated, such that the guide block moves in the front-rear direction,
   wherein the armrest and the guide block are slidably engaged with each other in a direction inclined with respect to the lateral width direction and the front-rear direction of the seat, and
   wherein the armrest is configured to move in conjunction with the guide block in the lateral width direction, in response to an operation that the operation portion is operated to move the guide block in the front-rear direction,
   wherein the operation portion includes a screw shaft which is rotatable around an axis of the screw shaft, wherein the guide block is attached to the screw shaft, and
wherein the guide block attached to the screw shaft is configured to move in an axial direction of the screw shaft, in response to the operation that the operation portion is operated to rotate the screw shaft.

2. The armrest structure according to claim 1,
wherein the operation portion is disposed below the armrest such that the screw shaft is parallel to a longitudinal direction of the armrest.

3. The armrest structure according to claim 1,
wherein the armrest includes an engagement projection formed to project from a lower surface of the armrest.

4. The armrest structure according to claim 1,
wherein the guide block includes a guide portion provided so as to face a lower surface of the armrest, and
wherein the guide portion has a guide groove formed on an upper surface of the guide portion.

5. An armrest structure of a seat, comprising:
a support portion;
an armrest configured to move in a lateral width direction of the seat with respect to the support portion;
a guide block configured to move in a front-rear direction of the seat with respect to the support portion; and
an operation portion configured to be manually operated, such that the guide block moves in the front-rear direction,
wherein the armrest and the guide block are slidably engaged with each other in a direction inclined with respect to the lateral width direction and the front-rear direction of the seat,
wherein the support portion includes a support hole penetrating in the front-rear direction of the seat, the support hole rotatably supporting the operation portion, and
wherein the armrest is configured to move in conjunction with the guide block in the lateral width direction, in response to a rotating operation that the operation portion is operated to move the guide block in the front-rear direction.

* * * * *